(12) United States Patent
Skarin

(10) Patent No.: US 7,556,148 B2
(45) Date of Patent: Jul. 7, 2009

(54) PACKAGE

(75) Inventor: Jakob Skarin, Stockholm (SE)

(73) Assignee: Jakebox AB, Stockholm (SE)

( * ) Notice: Subject to any disclaimer, the term of this patent is extended or adjusted under 35 U.S.C. 154(b) by 499 days.

(21) Appl. No.: 10/538,849

(22) PCT Filed: Dec. 12, 2003

(86) PCT No.: PCT/SE03/01944

§ 371 (c)(1),
(2), (4) Date: Dec. 23, 2005

(87) PCT Pub. No.: WO2004/052752

PCT Pub. Date: Jun. 24, 2004

(65) Prior Publication Data

US 2006/0144728 A1    Jul. 6, 2006

(30) Foreign Application Priority Data

Dec. 12, 2002    (SE) ................... 0203675-4

(51) Int. Cl.
*B65D 85/57*    (2006.01)
(52) U.S. Cl. .................. 206/312; 206/308.1; 206/754
(58) Field of Classification Search ............. 206/308.1, 206/312, 311, 736, 751–759, 232, 738; 229/72
See application file for complete search history.

(56) References Cited

U.S. PATENT DOCUMENTS

| | | | |
|---|---|---|---|
| 2,954,119 A * | 9/1960 | Goldsholl | .................. 206/312 |
| 3,785,478 A | 1/1974 | Assa | |
| 5,522,500 A | 6/1996 | Mori | |
| 5,901,844 A * | 5/1999 | Gambardella et al. | .... 206/308.1 |
| 5,915,563 A * | 6/1999 | Gefen et al. | ................ 206/750 |
| 5,947,281 A * | 9/1999 | Kaneff | ........................ 206/313 |
| 5,971,157 A * | 10/1999 | Howell et al. | ................ 206/755 |
| 6,032,795 A * | 3/2000 | Ehrlund et al. | ............... 206/312 |
| 6,059,101 A * | 5/2000 | Gambardella et al. | .... 206/308.1 |
| 6,279,739 B1 * | 8/2001 | Moore et al. | ................. 206/312 |
| 6,505,737 B1 * | 1/2003 | Sherman | .................. 206/308.1 |
| 6,732,459 B1 * | 5/2004 | Clark | ....................... 40/124.06 |

FOREIGN PATENT DOCUMENTS

| | | |
|---|---|---|
| DE | 195 10 090 | 9/1996 |
| DE | 197 28 263 | 4/1998 |

* cited by examiner

*Primary Examiner*—Mickey Yu
*Assistant Examiner*—Steven A. Reynolds
(74) *Attorney, Agent, or Firm*—Young & Thompson

(57) ABSTRACT

A package for sheets, for example sheet formed information carriers such as CD-sheets, DVD, CDR, CD-RW and so on and including an outer envelope (3) and an inner envelope (4) formed separately or in one and a same piece together with the outer envelope, manufactured by carton, paper, plastic, wellpapp or the like which have been folded to constitute a cover protecting the sheets (2) or the actual sheet at the same time as the inner envelope (4) supports and partly encloses the sheet (2), so that from the inside (13; 14) of the outer envelope (3) close to its back portion (5) the inner envelope (4) extends in a direction forwards and includes at least one open space (6) delimited laterally by a double fold (7) on each side, which has a length forwards which extends past the half diameter of the stored sheet (2).

4 Claims, 3 Drawing Sheets

PACKAGE

BACKGROUND OF THE INVENTION

The present invention refers to a package for discs for example disc formed information carrier such as CD-discs, DVD, CDR, CD-RW and so on and comprising an outer envelope and an inner envelope of carton, paper or plastic, wellpapp or the like formed separately or in one on the same piece together with said outer envelope and cooperating with the same and said envelopes are folded in order to constitute a cover which protects the actual disc or discs at the same time as the inner envelope carriers and partly encloses the disc itself.

On the market there are today several different types of envelopes or packages for discs for example CD-discs, which usually are manufactured of a solid plastic material. These packages are weak and can very easy get broken during hard handling. Another drawback with this type of package is that it usually has a thickness which is greater than that thickness which easy can be provided by a package of paper or other sheet formed material. The types of packages which are now on the market and consist of folded carton blanks have the drawback that the CD-discs easily slide out from the same. There are also such types of packages of carton, which are formed as a book and which furthermore comprise a description of the melodies, which are on the CD-disc. Also this type of package has that drawback that the CD-disc itself easily slides out from the package when it has been opened.

SUMMARY OF THE INVENTION

The object of the present invention is to provide a new type of package for disc formed objects of the type mentioned above and where the drawbacks existing with the previously known packages have been eliminated.

Thanks to the invention a new type of package for disc formed objects has been provided, which in excellent way fulfills its purposes. The package itself comprises according to the invention an outer envelope and an inner envelope where said inner envelope has a special formation in order to grip and keep the actual disc in a special way so that the same can not slide out from the package until the same has been opened. The opening of the package is done in such a way that the same is opened in the same way as a book and first after that the package has been opened about to the half and more the disc itself can be taken out. Taking out of the disc is made easy in that the envelope in connection with its opening automatically lifts upwards that space, which contains the disc when the outer envelope has been opened somewhat over half its opening moment, which means that the disc is very easy to take out for a user. In other words, this means that when the package or envelope, which protects the disc is closed and half opened, the disc is kept in its place by a folded claw-formation and when the envelope is opened totally said claw-formation opens, lifts up and exposes said disc in order to make it easy to grip.

BRIEF DESCRIPTION OF THE DRAWINGS

The invention is described closer below by aid of a preferable embodiment example in view of the drawings enclosed, in which.

DETAILED DESCRIPTION OF THE PREFERRED EMBODIMENTS

Figure 1:
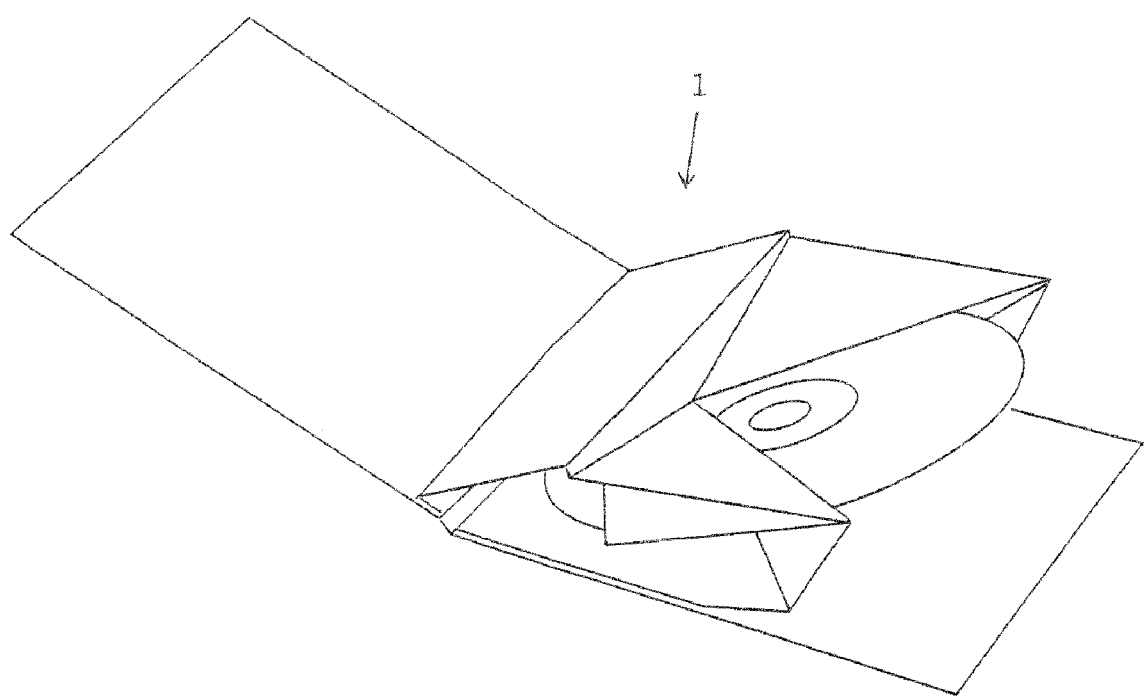
FIG. 1 shows a perspective view of the package according to the invention, in which the same has been opened somewhat and where said disc has been lifted upwards to be taken out.
Figure 2:
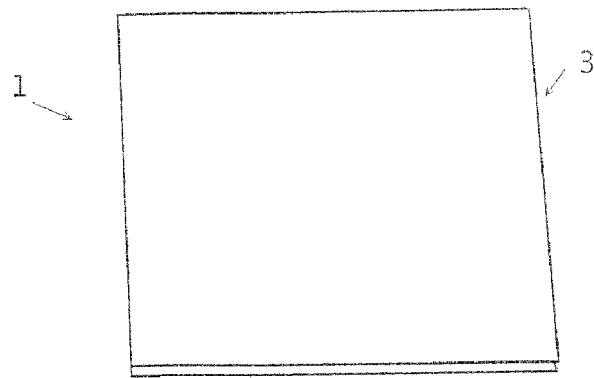
FIG. 2 shows a schematic perspective view in a view oblique from above, where the package is in its closed position.
Figure 3:
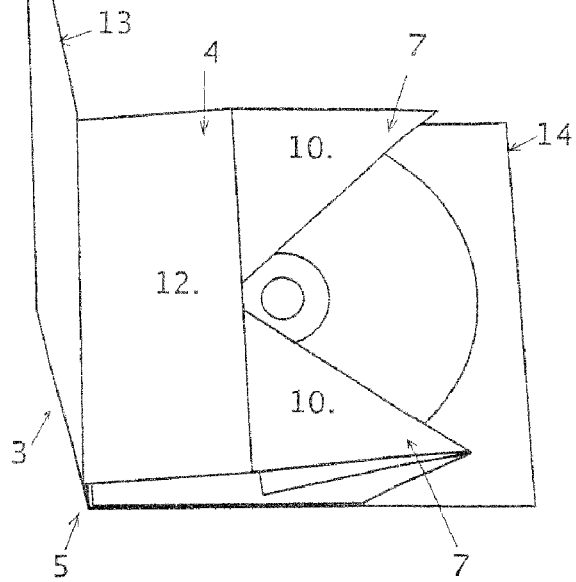
FIG. 3 shows the same view as in FIG. 2 but in a view obliquely from above and where a package has been opened to about the half and where the claw-formation is going to loosen the disc.
Figure 4:
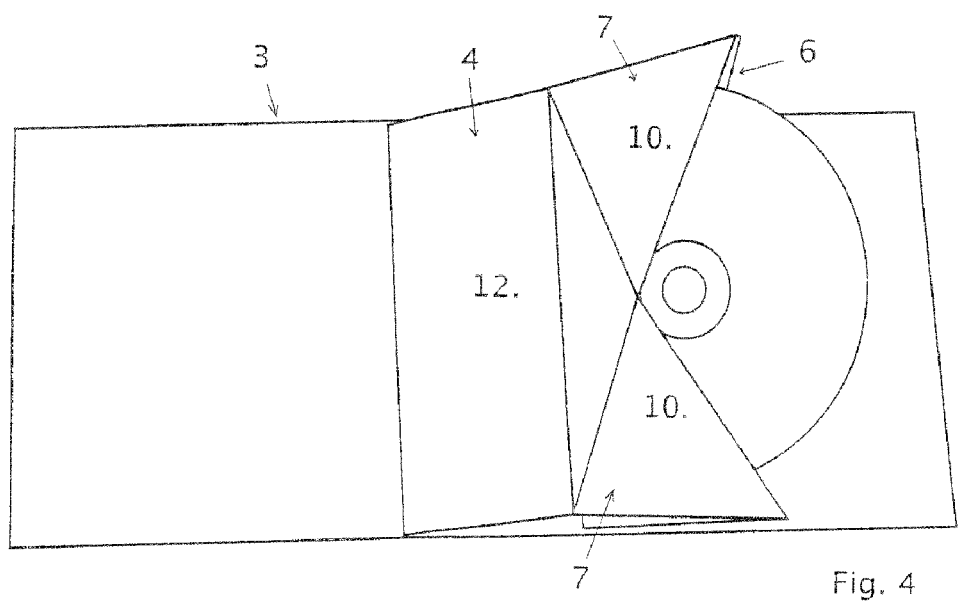
FIG. 4 shows the same view obliquely from above where the package has been opened totally so that the disc is not at all kept in place by said claw-formation.

As can be seen from the figures a package 1 is illustrated according a preferred embodiment example of the invention intended for discs 2, for example disc formed information carriers, which comprise an outer envelope 3 of carton, paper and plastic, corrugated board or similar and an inner envelope 4 which can be manufactured of a similar material as the outer envelope 3 and which has been double folded to constitute a cover for protecting the disc 2 at the same time as the inner envelope 4 supports and partly encloses the disc 2 itself. In the example illustrated the inner envelope is manufactured separately and thereafter fixed to the outer envelope 3 but the inner envelope 4 and outer envelope 3 can also be formed separated from each other.

As can be seen from the figures the inner envelope 4 is fixed and formed in such a way relatively the outer envelope 3 that these two envelopes cooperate with each other in storing and taking out of the disc 2 from the package 1.

From the inner side 13 of the outer envelope 3 close to its back portion 5 the inner envelope 4 extends in a direction forwards and comprises here an open space 6 delimited laterally of a double fold 7 on each side, which has a length forwards from said back portion 5, which extends past the half diameter of the stored disc 2, so that during the closed position of the package 1 and up to its mainly half opened position or immediately before the half opened position said space 6 has an opening width, which, after the extending forwards of said double fold 7 past the half diameter of the stored disc 2, is less that of the diameter of the disc 2, in that said double folds 7 converge in a direction towards each other in order to prevent said disc 2 from sliding out from said space 6 and during the continued opening of said package 1 and up to its totally opened position, said space 6 has an opening width, which is greater than the diameter of the disc 2 at the same time as the space 6 having a stored disc 2 is automatically lifted upwards and exposes said disc 2 and makes it easy to grip.

Figure 5:
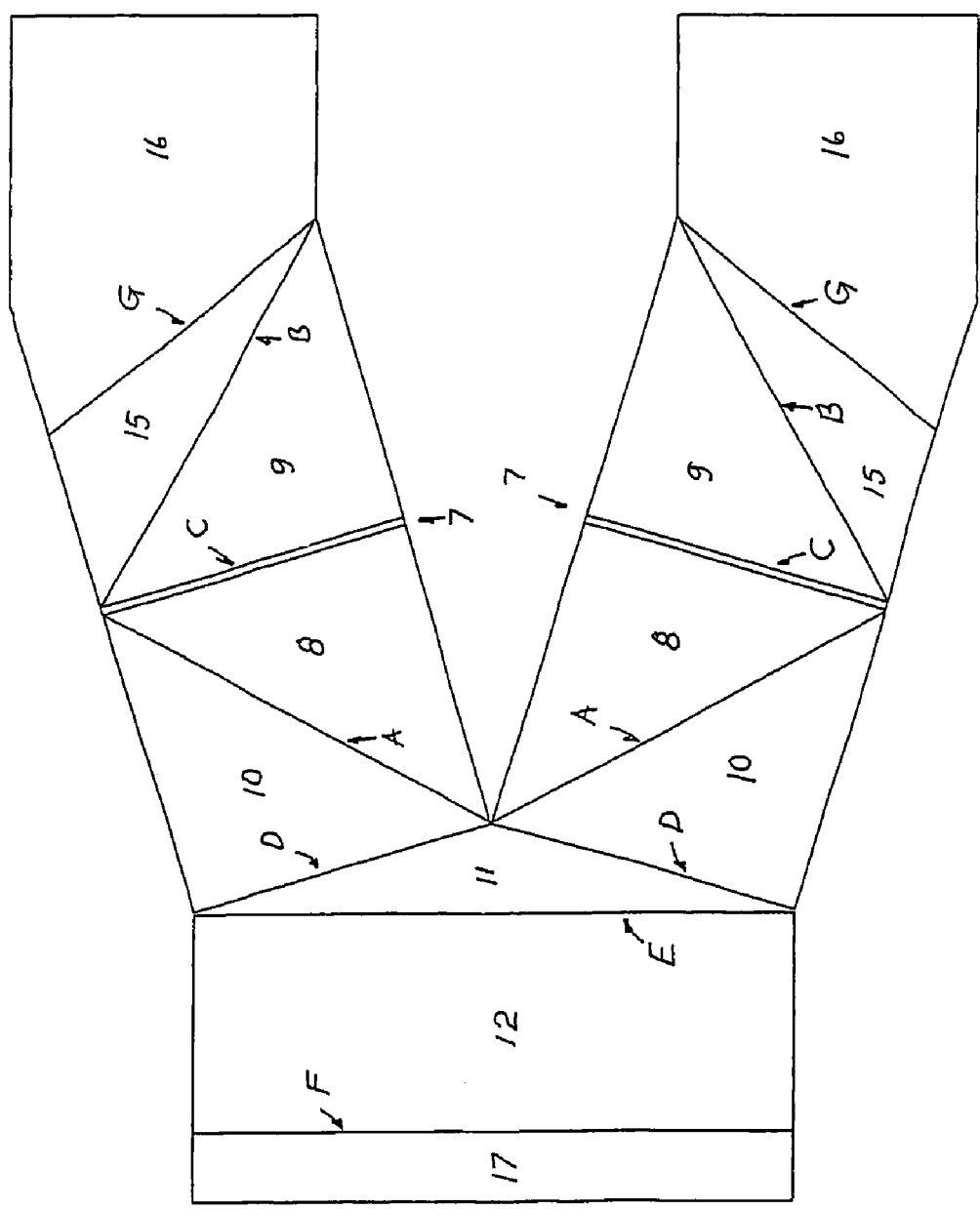
FIG. 5 shows a plan view of the blank which is used as an inner envelope for cooperation with said outer envelope and for supporting the disc itself.

As is closer illustrated in FIG. 5 said opened space 6 in the inner envelope 4 is constituted by two double folds 7, which consists of two along a creasing line C, in the illustrated example in the form of a double creasing line, foldable and directed towards each other, triangle formed portions 8,9 and said portions 8,9 in turn are via upper and lower creasing lines A and B foldable formed in said inner envelope 4. The upper creasing lines A extend in each triangle formed portion 10, which in turn are foldable and symmetrically connected via creasing lines D by a triangle formed portion 11 delimited forwards in a direction viewed from said back portion 5 of the last mentioned creasing lines D. The creasing lines D are of the same length and the limit two sides of the triangle formed portion 11, said portion along its base side is delimited of a transversitally extending creasing line D. The creasing line E extends in turn into a portion 12, at which a triangle formed portion 11 is foldable provided. The base of the portion 12 consists of a creasing line F, by which a portion 12 via a flap 12 are foldable connected with any of the two insides 13 or 14 of the outer envelope 3 in a short distance from the back portion 5, i.e. the inside of the front or backside. The flap 17 is fixable against the front inside 13 and is intended to extend in a direction towards the back portion 5 or alternatively in an opposite direction in the direction upwards over the front inside 13. The lower creasing lines B of the double fold 7 extend into a portion 15, which via creasing lines G foldably extend into a portion 16, which is fixed to the back inside 14 of outer envelope 3.

In FIG. 5 is thus illustrated how the inner envelope 4 of the package 1 is formed with its creasing lines and portions and from this figure it is specially the portion 11 having the creasing lines D and E, which make or influence the opening and closing of the claw-formation during the cooperation of the inner envelope 4 with said outer envelope 3.

The invention claimed is:

1. A package for a disc, comprising:
   an outer envelope folded at a fold line to constitute a cover protecting a disc; and
   an inner envelope having a proximal end connected to said outer envelope adjacent to said fold line, said inner envelope being made from carton, paper, plastic, or corrugated board, said inner envelope supports and partly encloses a disc, said inner envelope comprises at least one open space delimited laterally by a double fold on each side of a distal end of said inner envelope, the open space being immediately adjacent to a triangular portion of the inner envelope, said triangular portion having a base parallel with the fold line of the outer envelope,
   wherein when said outer envelope is in a closed position and up to substantially a half open position of the package said open space has a first opening width defined between the double folds with said double folds converging in a direction towards each other in order to retain a disc in the space, and during the continued opening of the package and up to a totally opened position, said open space has a second opening width, which is greater than said first opening width in order to enable a disc to be removed from the space,
   wherein during the continued opening of the package and up to the totally opened position, the space is automatically lifted upwards, away from an inside of said outer envelope, in order to expose a disc and at the same time to enable a disc to be readily grasped.

2. A package for a disc, comprising:
   an outer envelope folded at a fold line to constitute a cover protecting a disc; and
   an inner envelope having a proximal end connected to said outer envelope adjacent to said fold line, said inner envelope being made from carton, paper, plastic, or corrugated board, said inner envelope supports and partly encloses a disc, said inner envelope comprises at least one open space delimited laterally by a double fold on each side of a distal end of said inner envelope, the open space being immediately adjacent to a triangular portion of the inner envelope, said triangular portion having a base parallel with the fold line of the outer envelope,
   wherein when said outer envelope is in a closed position and up to substantially a half open position of the package said open space has a first opening width defined between the double folds with said double folds converging in a direction towards each other in order to retain a disc in the space, and during the continued opening of the package and up to a totally opened position, said open space has a second opening width, which is greater than said first opening width in order to enable a disc to be removed from the space,
   wherein each double fold comprises two fold portions folded towards each other along at least one outer fold line, said two fold portions are formed via upper and lower fold lines in said inner envelope,
   said upper fold lines each extend into a respective first portion, which in turn is foldable as symmetrically connected via connection fold lines with said triangular portion, said triangular portion is delimited in a direction away from the fold line of the outer envelope by the connection fold lines and in a direction toward said fold line of the outer envelope, at said base of the triangular portion by a lateral fold line extending laterally a width of the inner envelope, said lateral fold line extends into a third portion, said third portion is foldable and extends into either a front inside or a back inside of the outer envelope, a short distance from the fold line of the outer envelope via a flap, said flap is at said proximal end of said inner envelope and is fixed against one of the front inside or the back inside of the outer envelope and extends into a direction towards the fold line of the outer envelope or in an opposite direction towards the front inside or the back inside at the same time as the lower fold lines of the double fold extend into a fourth portion, said fourth portion via corresponding fold lines foldably extend into fifth portions, which are fixed against the other of the front inside or the back inside of the outer envelope.

3. A package for discs, comprising:
   an outer envelope folded at a fold line to form a cover for protecting a disc; and
   an inner envelope having a proximal end connected to said outer envelope adjacent to said fold line, said inner envelope comprises at least one open space delimited laterally by first and second portions of a distal end of said inner envelope, the open space being immediately adjacent to a triangular portion of the inner envelope, said triangular portion having a base parallel with the fold line of the outer envelope,
   wherein when said outer envelope is in a closed position, said first and second portions converge in a direction towards each other so as to have a width that is less than a width of said base of the triangular portion, and when the outer envelope is in an opened position, part of said first and second portions laterally extend beyond said width of said triangular portion,
   wherein the first and second portions each comprises two fold portions folded towards each other along at least one outer fold line,
   one of said two fold portions is connected at connection fold lines to a first section, said first section is connected to a side of said triangular portion by a triangle portion fold line, said triangular portion being an isosceles triangle, said base of said triangular portion is connected by a lateral fold line extending laterally a width of the outer envelope to a second section, said second section is foldable and is connected to an inside of the outer envelope adjacent to the fold line of the outer envelope by a flap at said proximal end of the inner envelope,
   another one of said two fold portions is connected to a third section by a corresponding fold line, said third section is connected to a fourth section by a final fold line, said fourth section is fixed against the inside of the outer envelope at a position opposing said flap.

4. A package in combination with a disc, comprising:
an outer envelope folded at a fold line to form a cover for protecting said disc; and
an inner envelope having a proximal end connected to said outer envelope adjacent to said fold line, said inner envelope comprises at least one open space delimited laterally by first and second portions of a distal end of said inner envelope,
wherein when said outer envelope is in a closed position, said first and second portions converge in a direction towards each other so as to have a width that is less than a maximum diameter of said disc so as to retain said disc in the inner envelope, and when the outer envelope is in an opened position, part of said first and second portions laterally extend beyond said maximum diameter so as to enable said disc to be removed from the inner envelope.

* * * * *